US009255725B2

(12) United States Patent
Al-Enizi

(10) Patent No.: US 9,255,725 B2
(45) Date of Patent: Feb. 9, 2016

(54) SUN TRACKING SOLAR ENERGY COLLECTION SYSTEM

(71) Applicant: Jasem M K TH SH Al-Enizi, Sulaibiya (KW)

(72) Inventor: Jasem M K TH SH Al-Enizi, Sulaibiya (KW)

( * ) Notice: Subject to any disclaimer, the term of this patent is extended or adjusted under 35 U.S.C. 154(b) by 107 days.

(21) Appl. No.: 14/168,891

(22) Filed: Jan. 30, 2014

(65) Prior Publication Data

US 2015/0211768 A1    Jul. 30, 2015

(51) Int. Cl.
*F24J 2/38*        (2014.01)

(52) U.S. Cl.
CPC ... *F24J 2/38* (2013.01); *Y02E 10/47* (2013.01)

(58) Field of Classification Search
USPC .......... 126/574, 579, 601, 602, 576; 343/766
See application file for complete search history.

(56) References Cited

U.S. PATENT DOCUMENTS

| | | | |
|---|---|---|---|
| 4,010,614 A | 3/1977 | Arthur | |
| 4,031,444 A * | 6/1977 | Beck, Jr. ................. | G05D 3/105 126/576 |
| 4,063,543 A * | 12/1977 | Hedger ..................... | F24J 2/16 126/579 |
| 4,102,326 A * | 7/1978 | Sommer ..................... | F24J 2/10 126/575 |
| 4,107,521 A * | 8/1978 | Winders .................... | F24J 2/38 126/577 |
| 4,170,985 A * | 10/1979 | Authier ..................... | F03G 6/06 126/573 |
| 4,179,612 A | 12/1979 | Smith | |
| 4,213,303 A | 7/1980 | Lane | |
| 4,252,107 A | 2/1981 | Horton | |
| 4,347,834 A * | 9/1982 | York .......................... | F24J 2/10 126/602 |
| 4,459,972 A * | 7/1984 | Moore ....................... | F24J 2/10 126/600 |
| 4,547,972 A * | 10/1985 | Heidel ...................... | G01C 9/06 33/299 |
| 4,585,318 A * | 4/1986 | Seifert ...................... | F24J 2/02 126/573 |
| 5,256,942 A * | 10/1993 | Wood ....................... | B64G 1/28 318/649 |
| 5,730,117 A * | 3/1998 | Berger ...................... | F24J 2/38 126/600 |
| 5,798,517 A * | 8/1998 | Berger ...................... | F24J 2/38 126/573 |
| 6,123,067 A * | 9/2000 | Warrick .................... | F24J 2/38 126/593 |
| 6,284,968 B1 * | 9/2001 | Niesyn ...................... | F24J 2/13 126/600 |
| 6,490,540 B1 * | 12/2002 | Kurzeja ............. | B60G 17/0152 702/151 |
| 7,374,137 B2 * | 5/2008 | Staney ................... | F16M 11/10 108/10 |

(Continued)

FOREIGN PATENT DOCUMENTS

JP     58-18059     2/1983

*Primary Examiner* — Avinash Savani
*Assistant Examiner* — George R Blum
(74) *Attorney, Agent, or Firm* — Richard C. Litman

(57) ABSTRACT

A sun tracking solar energy collection system includes a sun tracker having a base with a rotatable member driven by a base motor. A support extends from the base and is rotatably driven in conjunction with the rotatable member by the base motor. An arm in communication with the support is pivotable relative to the base and the support and is driven by an arm motor associated with the arm. A light sensitive element in conjunction with the arm receives a light from a light source for determining an amount of received light. A solar energy collector is movably positioned to correspond to a relative position of the base and the arm to correspond to the position of the light source for collecting solar energy. A controller controls a position of the sun tracker and the solar energy collector to correspond to a position of the light source.

9 Claims, 9 Drawing Sheets

(56) References Cited

U.S. PATENT DOCUMENTS

| | | | | |
|---|---|---|---|---|
| 7,795,568 B2* | 9/2010 | Sherman | F24J 2/38 | 250/203.1 |
| 8,017,895 B2* | 9/2011 | Moser | F24J 2/38 | 126/601 |
| 8,100,122 B2* | 1/2012 | Collins | F24J 2/405 | 126/601 |
| 8,101,896 B2 | 1/2012 | Alenizi | | |
| 8,442,790 B2* | 5/2013 | Fukuba | F24J 2/40 | 702/85 |
| 8,592,738 B1* | 11/2013 | Kozin | F24J 2/38 | 126/573 |
| 2007/0062516 A1* | 3/2007 | Lasich | F24J 2/12 | 126/574 |
| 2007/0095993 A1* | 5/2007 | Yamamoto | A47B 21/0314 | 248/284.1 |
| 2010/0059045 A1* | 3/2010 | Guinea Diaz | F24J 2/38 | 126/601 |
| 2010/0180884 A1* | 7/2010 | Oosting | F24J 2/38 | 126/574 |
| 2011/0088684 A1* | 4/2011 | Tuli | F24J 2/18 | 126/573 |
| 2011/0094565 A1* | 4/2011 | Banin | A63B 21/0004 | 136/246 |
| 2011/0108019 A1* | 5/2011 | Minick | F24J 2/38 | 126/600 |
| 2011/0114080 A1* | 5/2011 | Childers | F03G 7/06 | 126/601 |
| 2011/0197879 A1* | 8/2011 | Levin | B01D 1/0035 | 126/636 |
| 2011/0209696 A1* | 9/2011 | O'Rourke | F24J 2/5417 | 126/600 |
| 2012/0266938 A1* | 10/2012 | Goei | F24J 2/38 | 136/246 |
| 2013/0000693 A1* | 1/2013 | Waterhouse | F24J 2/5233 | 136/246 |
| 2013/0032135 A1* | 2/2013 | Waterhouse | F24J 2/38 | 126/572 |
| 2013/0048829 A1 | 2/2013 | Herniak | | |
| 2013/0074825 A1* | 3/2013 | Mastronardi | F24J 2/08 | 126/601 |
| 2013/0213455 A1* | 8/2013 | Matalon | F24J 2/38 | 136/248 |

* cited by examiner

SUN TRACKING SOLAR ENERGY COLLECTION SYSTEM

BACKGROUND OF THE INVENTION

1. Field of the Invention

The present invention relates to alternative energy, and particularly to a sun tracking solar energy collection system.

2. Description of the Related Art

Solar energy can provide an efficient source of power that is relatively environmentally-friendly in comparison to other forms of power generators, such as generators using natural gas, for example. Solar power generation generally involves the absorption of light, such as sunlight, through a solar energy collector to allow for the conversion of the light into electricity. A potential drawback when using sunlight in the solar energy collection system is the need to reposition the solar energy collector to maintain contact with the sunlight.

Present approaches to address this issue can include a user manually repositioning the solar energy collector to be in contact with the sunlight. Another possible approach is to automate the movement of the solar energy collector in specified time intervals, such as moving the solar energy collector a number of degrees every few hours, for example. These approaches can be problematic however because of the movement of the sun.

Therefore, it is desirable for a solar energy collection system that utilizes sunlight to take into account the movement and position of the sun to efficiently maintain orientation between the solar energy collector and the sun to collect the solar energy.

Thus, a sun tracking solar energy collection system addressing the aforementioned problems is desired.

SUMMARY OF THE INVENTION

Embodiments of a sun tracking solar energy collection system are provided. An embodiment of a sun tracker includes a base having a rotatable member that is associated with and driven by a base motor. A support extends from the base and is also associated with the rotatable member of the base to be rotatably driven in conjunction with the rotatable member by the base motor. An arm is in communication with the support and is pivotable relative to the base and the support. The arm is pivotably driven by an arm motor associated with the arm. A light sensitive element is positioned in conjunction with the arm and receives a light from a light source for determining an amount of received light from the light source. The sun tracker further includes a controller with a processor that controls a position of the sun tracker to correspond to a position of the light source. The controller selectively controls operation of the base motor to control the rotatable movement of the rotatable member and selectively controls operation of the arm motor to control the pivotable movement of the arm. The selective control of the base motor and the arm motor is based on the amount of light received by the light sensitive element from the light source to selectively change a relative position of the base and the arm to correspond to the position of the light source.

Embodiments of a sun tracker can also include a base support member in communication with a rotatable member that is rotatably driven for rotatable movement in a horizontal plane relative to the base support member. A light sensitive element support member is in communication with the rotatable member and is pivotably driven for pivotable movement relative to the horizontal plane of the base support member. A light sensitive element is positioned in conjunction with the light sensitive element support member and is movably positioned corresponding to the rotatable movement of the rotatable member and the pivotable movement of the light sensitive element support member to correspond to a position of a light source. The light sensitive element receives light from the light source to determine an amount of received light from the light source. The sun tracker further includes a controller with a processor that controls a position of the sun tracker to correspond to a position of the light source. The controller selectively controls the rotatable movement of the rotatable member and selectively controls the pivotable movement of the light sensitive element support member. The selective movement is based on the amount of light received by the light sensitive element from the light source to selectively change a relative position of the base support member and the light sensitive element support member to correspond to the position of the light source.

Embodiments of a sun tracking solar energy collection system can include a sun tracker with a base having a rotatable member associated with a base motor and the rotatable member being rotatably driven by the base motor. A support extends from the base and is associated with the rotatable member to be correspondingly rotatably driven in conjunction with the rotatable member by the base motor. An arm is in communication with the support and is pivotable relative to the base and support. The arm is pivotably driven by an arm motor associated with the arm. A light sensitive element is positioned in conjunction with the arm and receives a light from a light source to determine an amount of received light from the light source. The solar energy collection system also includes a solar energy collector to collect solar energy. The solar energy collector can be movably positioned to a position to correspond to a relative position of the rotatable member and the arm to correspond to the position of the light source with the light source providing the solar energy. The solar energy collector includes a collector base support member having a collector rotatable member that is rotatably driven for rotatable movement in a horizontal plane relative to the collector base support member. The solar energy collector further includes a solar energy receiver support member in communication with the collector base support member and having a pivotable member that is pivotably driven for pivotable movement relative to the horizontal plane of the collector base support member. Further, the solar energy collector includes a solar energy receiver positioned in conjunction with the pivotable member of the solar energy receiver support member that can be movably positioned corresponding to the rotatable movement of the collector rotatable member and the pivotable movement of the pivotable member of the solar energy receiver support member to correspond to the position of the light source for receiving solar energy from the light source.

The solar energy collection system further includes a controller with a processor that controls a position of the sun tracker to track a position of the light source and to selectively control a position of the solar energy receiver to correspond to the position of the light source determined by the sun tracker. The controller also selectively controls the operation of the base motor to control the rotatable movement of the rotatable member and selectively controls the operation of the arm motor to control the pivotable movement of the arm. The selective control is based on the amount of light received by the light sensitive element from the light source to selectively change a relative position of the rotatable member and the arm to correspond to the position of the light source.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
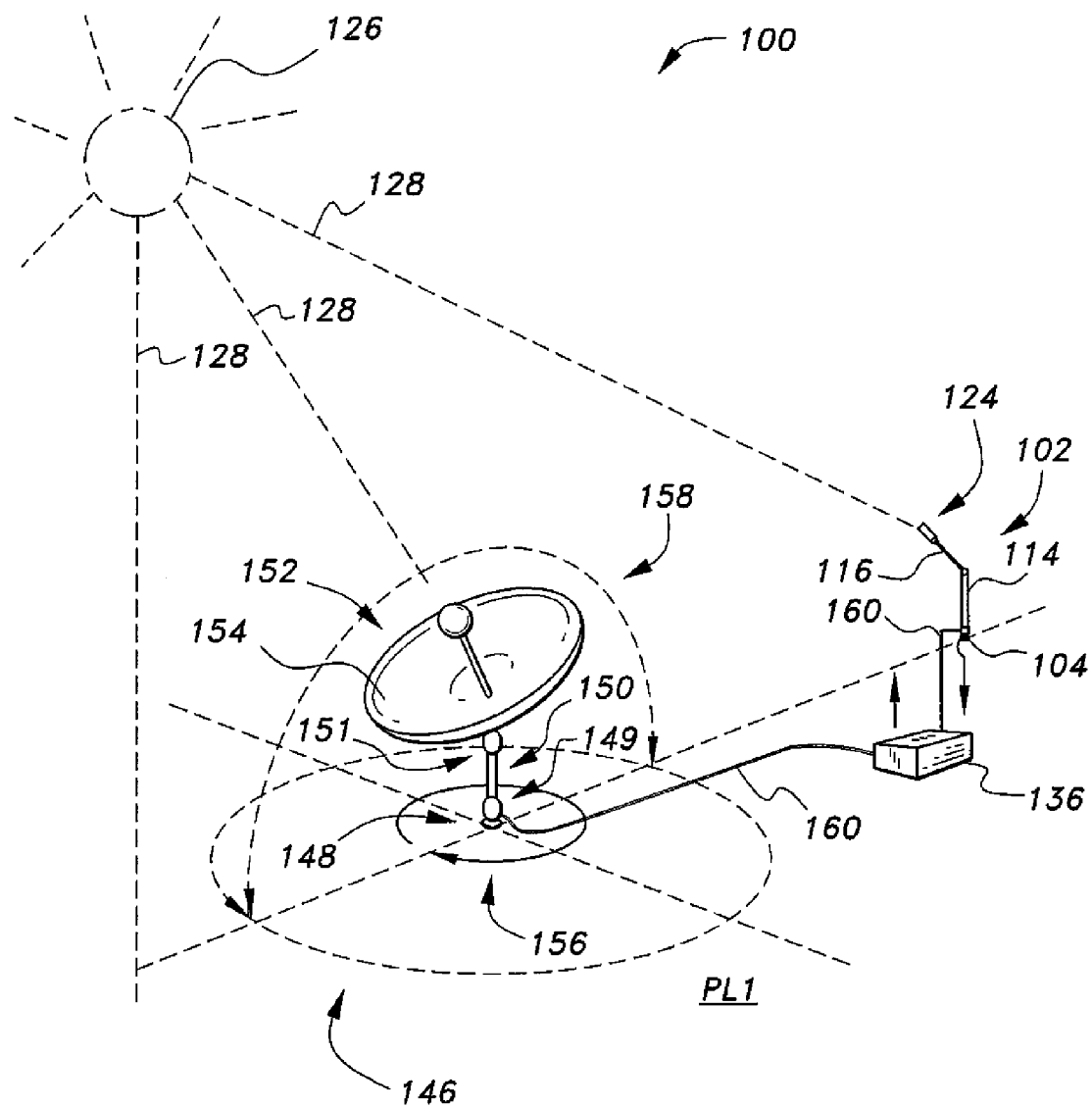
FIG. 1 is an environmental view of an embodiment of a sun tracking solar energy collection system including an embodiment of a sun tracker and an embodiment of a solar energy collector having a solar energy receiver having a hemi-spherical concave mirror reflecting element according to the present invention.

Referring to FIG. 1, a sun tracking solar energy collection system 100 is shown. The sun tracking solar energy collection system 100 includes a sun tracker 102 that tracks and locates a light source 126 emitting a light 128. As shown in FIG. 1, the light source 126 can be the sun or other suitable light source and the light 128 that is emitted from the light source 126 can be sunrays, for example. The sun tracker 102, as shown in FIGS. 1, 2A, 3A and 3B, has a base 104 that can support or assist in maintaining the sun tracker 102 in a suitable position, such as an upright position, when the sun tracker 102 is positioned on a surface, such as on a ground surface, for example.

The base 104 has a rotatable member 106 that can be rotatably driven for rotatable movement 110 by a base motor 108. The rotatable member 106 can rotate along a horizontal plane P that is relative to the base 104 to measure a relative horizontal angular displacement D of the rotatable member 106 along the horizontal plane P relative to the base 104. The relative horizontal angular displacement D is measured by at least one first angular displacement sensor 112 associated with the base motor 108 to measure the relative horizontal angular displacement D, such as shown in FIG. 3B by the markings indicating the relative angular displacement indicating 10 degrees. 20 degrees, 30 degrees, for example, of the rotatable member 106 along the horizontal plane P relative to the base.

A support 114 extends from the base 104 and is associated with the rotatable member 106. By being associated with the rotatable member 106, the support 114 can be correspondingly rotatably driven in conjunction with the rotatable member 106 by the base motor 108 as the rotatable member 106 undergoes rotatable movement 110. This can allow for both the support 114 and the rotatable member 106 to be rotatably driven together by the base motor 108.

An arm 116 is in communication with the support 114. The arm 116 is pivotable relative to the base 104 and the support 114. The arm 116 is pivotally driven by an arm motor 118 that is associated with the arm 116 for pivotable movement 120. At least one second angular displacement sensor 122 is associated with the arm motor 118 to measure a relative vertical angular displacement V, as shown in FIG. 3B, of the arm 116 relative to the horizontal plane P.

Figure 2A:
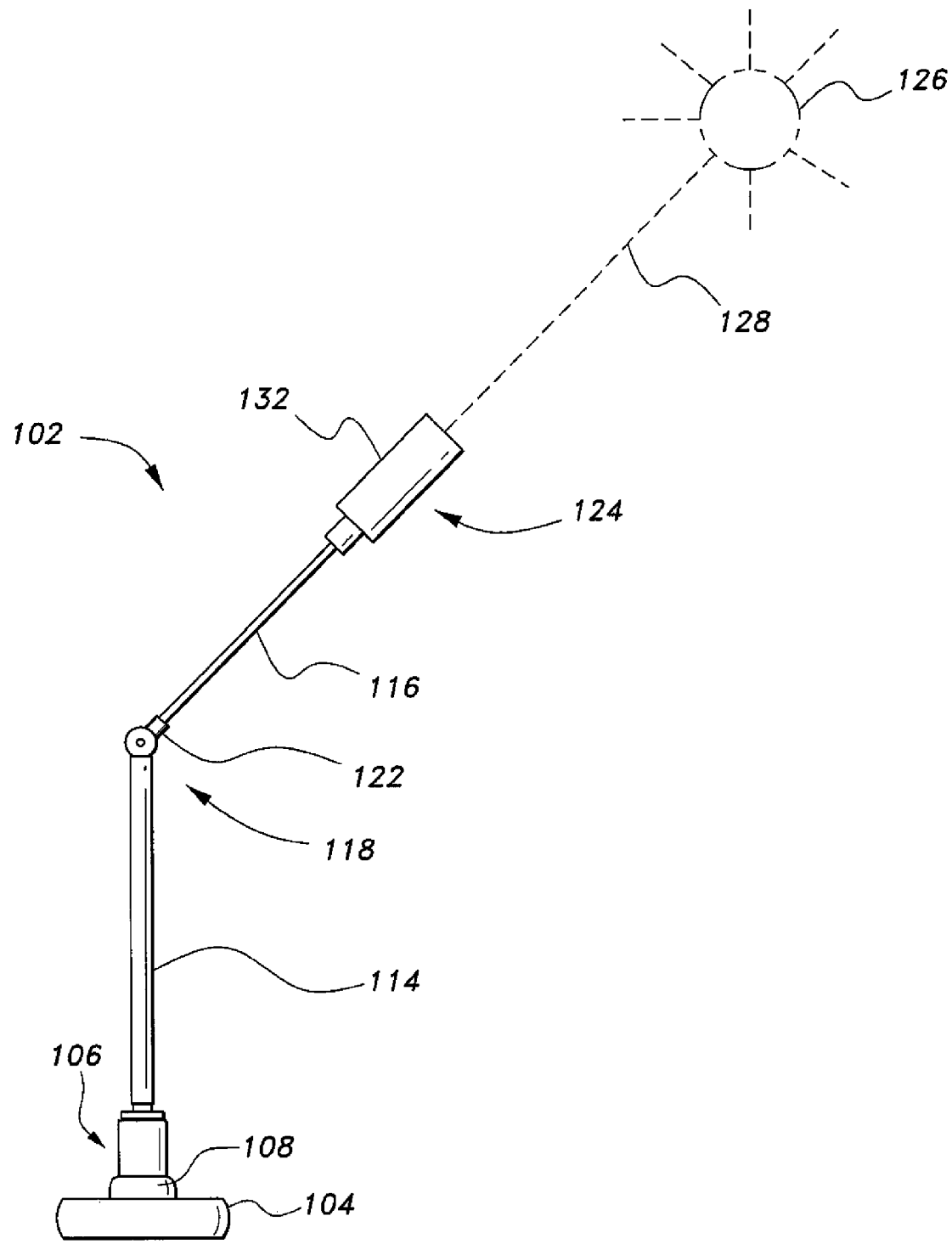
FIG. 2A is a front view of an embodiment of a sun tracker of FIG. 1 according to the present invention.
Figure 2B:
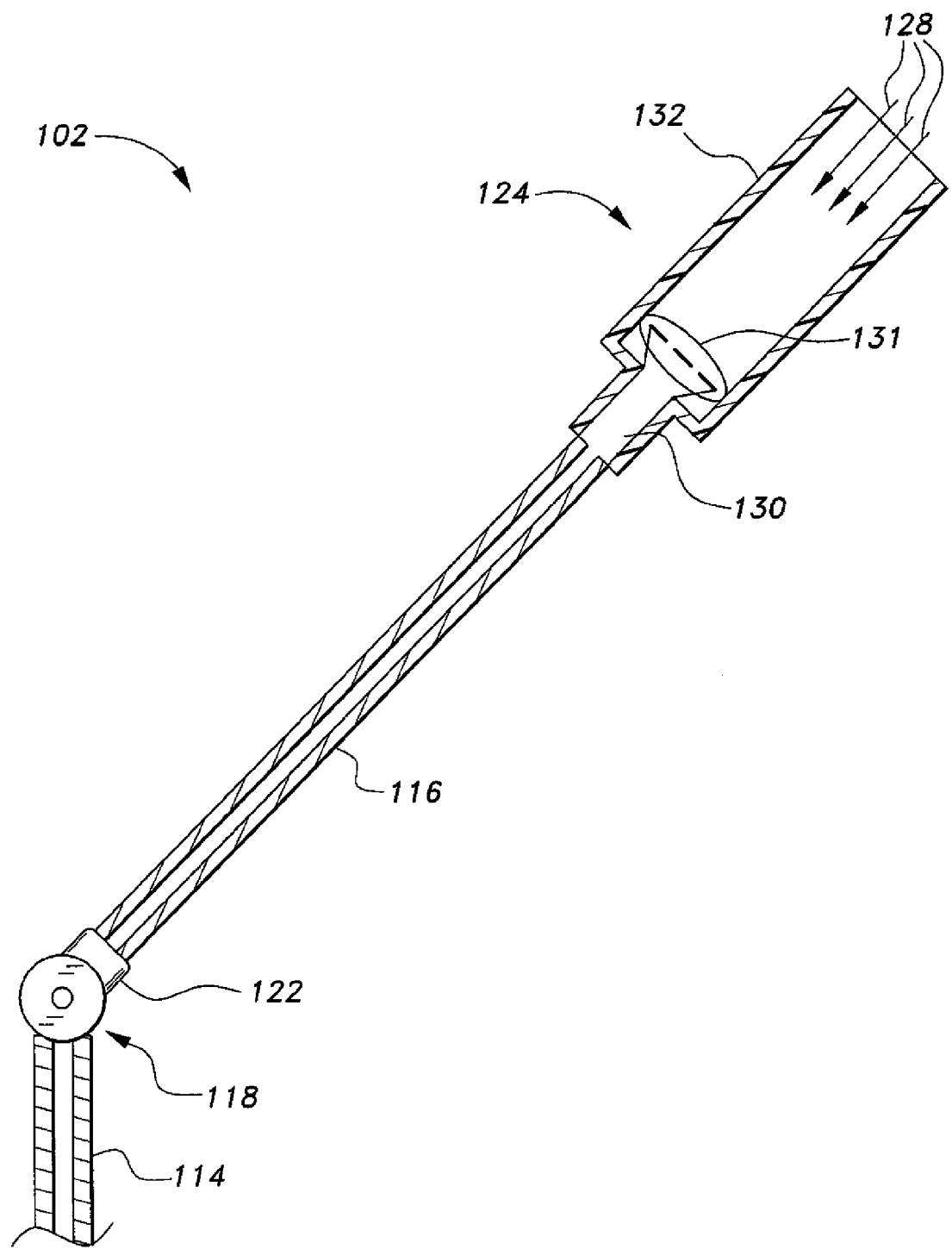
FIG. 2B is a cross-sectional view of an embodiment of a sun tracker of FIG. 1 according to the present invention.
Figure 2C:
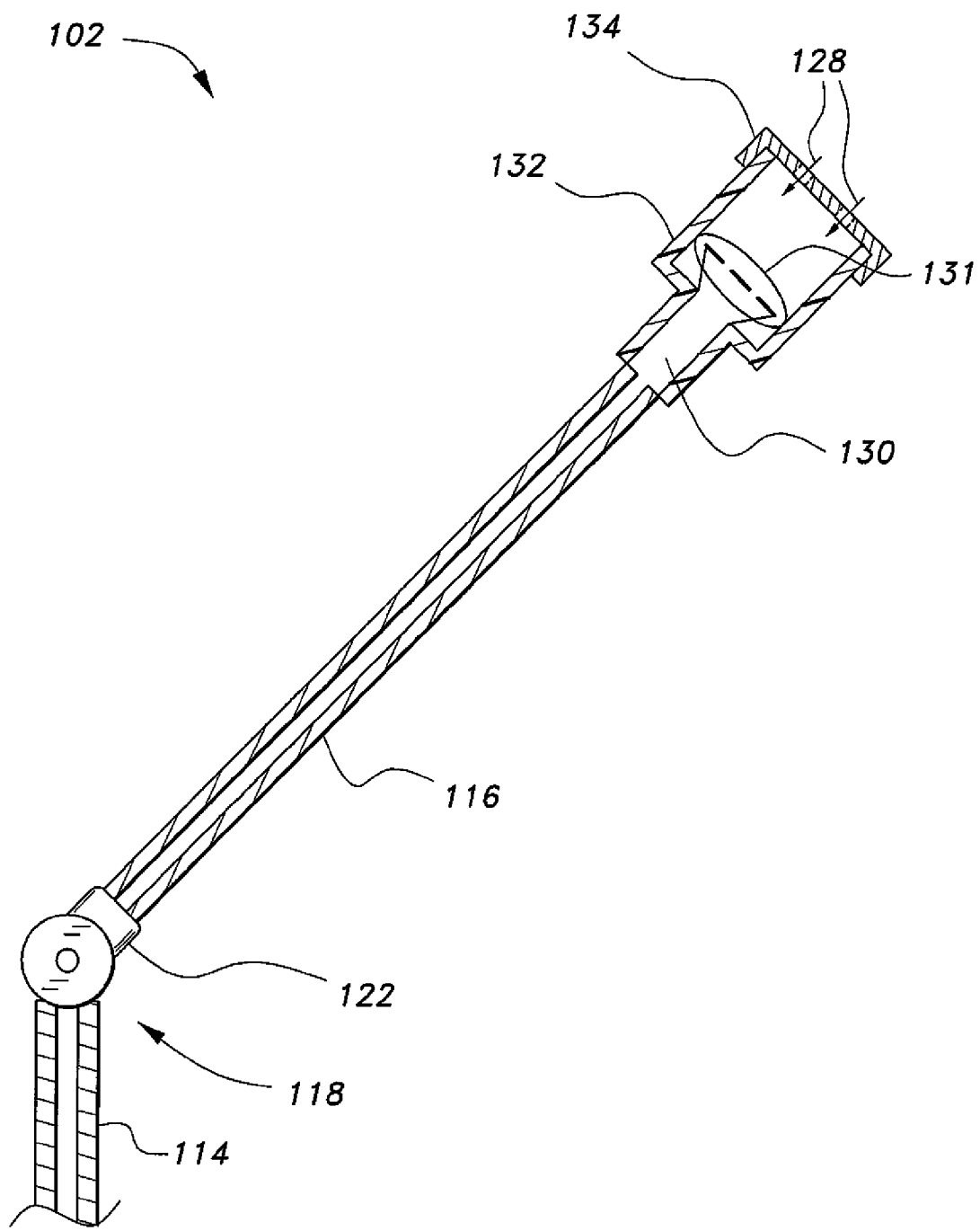
FIG. 2C is a cross-sectional view of an embodiment of a sun tracker of FIG. 1 having a cover associated with a light sensitive element of the sun tracker according to the present invention.

A light sensitive element 124 is positioned in conjunction with the arm 116, the light sensitive element 124 is adapted for receiving a light 128 from a light source 126, such as the sun, to determine an amount of received light 128 from the light source 126. The light sensitive element 124 can include a photoresistor 130. The photoresistor 130 has a face 131 that can be adapted for receiving the light 128 from the light source 126. The photoresistor 130 is positioned within a housing 132 located in conjunction with the arm 116. Further, the light sensitive element 124 can be associated with a cover 134, as shown in FIG. 2C, to selectively filter the light 128 received from the light source 126 to direct the light 128 received onto the face 131 of the photoresistor 130.

Figure 4:
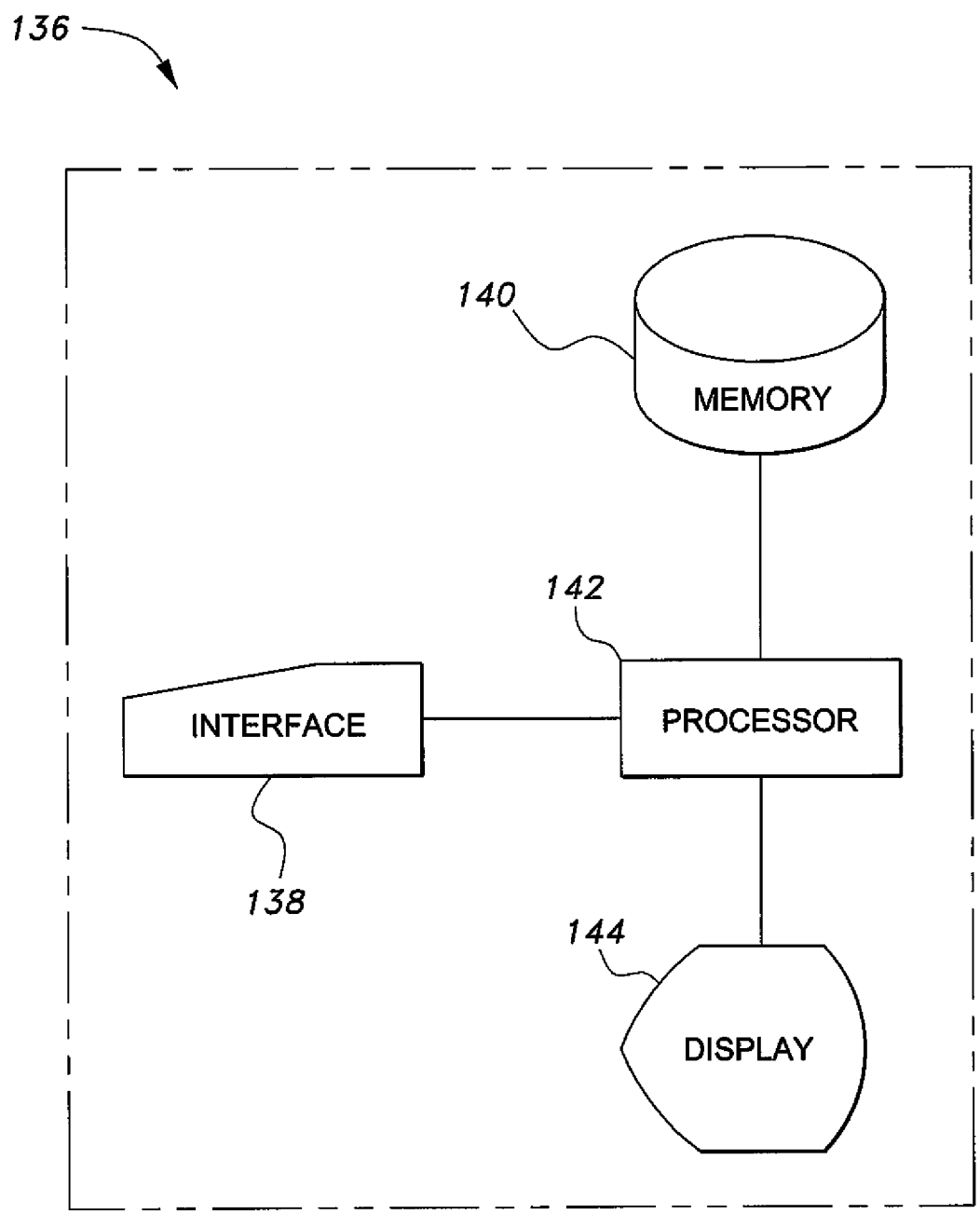
FIG. 4 is a schematic diagram of an embodiment of a controller of embodiments of a sun tracking solar energy collection system according to the present invention.

FIG. 4 illustrates a controller 136 for implementing embodiments of the sun tracker 102, and a solar energy collector 146 in the sun tracking solar energy collection system 100. It should be understood that the controller 136 can represent, for example, a stand-alone computer, computer terminal, portable computing device, networked computer or computer terminal, or networked portable device. Data, such as the received measurements of the horizontal angular displacement D and the vertical angular displacement V and the amount of light 128 received by the light sensitive element 124, can be received by the controller 136 by a suitable type of user interface 138, and can be stored in a computer readable memory 140, which can be any suitable type of computer readable and programmable memory. Calculations are performed by the processor 142, which can be any suitable type of computer processor, and can be displayed to the user on a display 144, which can be any suitable type of computer display, for example.

The processor 142 can be associated with, or incorporated into, any suitable type of computing device, for example, a personal computer or a programmable logic controller. The display 144, the processor 142, the memory 140, and the interface 138 and any associated computer readable media are in communication with one another by any suitable type of data bus, as is well known in the art.

The memory 140 can be one or more of a Secure Digital (SD) card or a MultiMediaCard (MMC) card, among others, for example. Also, examples of computer readable media, as can be used as the memory 140, can include a magnetic recording apparatus, non-transitory computer readable storage memory, an optical disk, a magneto-optical disk, and/or a semiconductor memory (for example, RAM, ROM, etc.). Examples of magnetic recording apparatus that can be used in addition to memory 140, or in place of memory 140, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Referring to FIGS. 1 and 4, the controller 136 can control a position of the sun tracker 102 to correspond to a position of the light source 126. The controller 136 selectively controls operation of the base motor 108 to control the rotatable movement 110 of the rotatable member 106 and to selectively control operation of the arm motor 118 to control the pivotable movement 120 of the arm 116. The rotatable movement 110 and the pivotable movement 120 are based on the amount of light 128 received by the light sensitive element 124 from the light source 126 to selectively change a relative position of the rotatable member 106 and the arm 116 to correspond to the position of the light source 126.

The at least one first angular displacement sensor 112 provides a measurement of the amount of the relative horizontal angular displacement D to the controller 136. Also, the at least one second angular displacement sensor 122 provides a measurement of the amount of the relative vertical angular displacement V to the controller 136. The corresponding amount of the received measurements of the horizontal angular displacement D and the vertical angular displacement V correspond to a change in the relative position of the rotatable member 106 and the arm 116 corresponding to the change in position of the light source 126. Further, the controller 136 is adapted for communication with the solar energy collector 146 to position a solar energy receiver 152 to correspond to the position of the light source 126 to receive solar energy based upon the corresponding amount of the received measurements of the horizontal angular displacement D and the vertical angular displacement V, the solar energy collector 146 including the solar energy receiver 152.

The controller 136 selectively controls the position of the solar energy collector 146 to correspond to the position of the light source 126 determined by the sun tracker 102, based on the corresponding amount of the received measurements of the horizontal angular displacement D and the vertical angular displacement V. The solar energy collector 146 collects solar energy and is adapted to be movably positioned to a position to correspond to a relative position of the rotatable member 106 and the arm 116 to correspond to the position of the light source 126, with the light source 126 providing the solar energy.

The controller 136 can communicate through the interface 138 with the base motor 108 and the arm motor 118. Further, the controller 136 can communicate through the interface 138 with the light sensitive element 124. The controller 136, through the interface 138, can also communicate with the solar energy collector 146 to selectively control the position of the solar energy collector 146 to correspond to the position of the light source 126 determined by the sun tracker 102.

The controller 136 associated with the memory 140 and can be programmed to store instructions to selectively control the relative movement of the rotatable member 106 and the arm 116 corresponding to the change in position of the light source 126 to control a position of the sun tracker 102 to track a position of the light source 126 and to selectively control a position of the solar energy collector 146 to correspond to the position of the light source 126 determined by the sun tracker 102.

Figure 5:
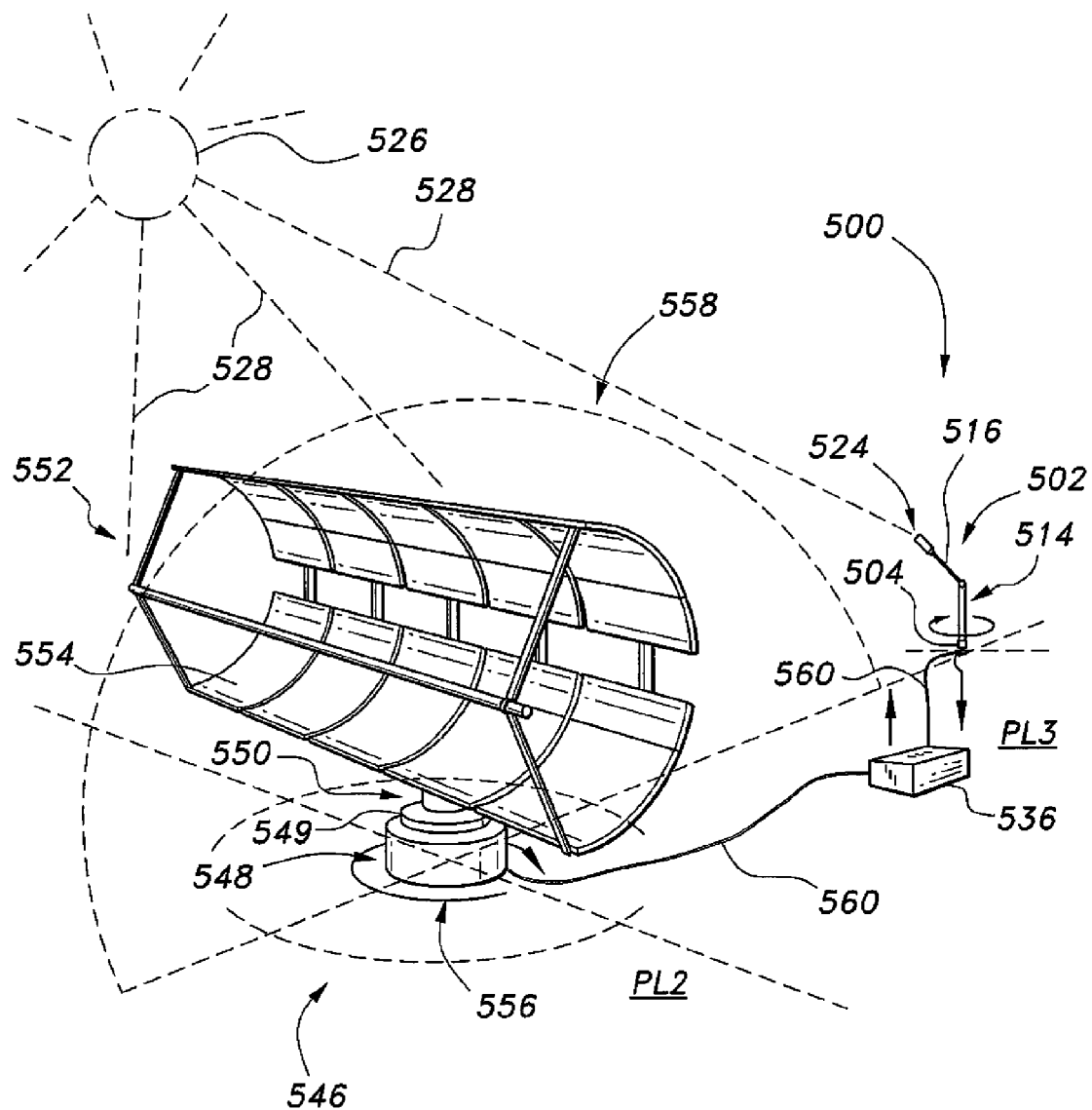
FIG. 5 is an environmental view of an embodiment of a sun tracking solar energy collection system including an embodiment of a sun tracker and an embodiment of a solar energy collector having a solar energy receiver having a hemi-cylindrical mirror reflecting element according to the present invention.

Continuing with reference to FIGS. 1-4 and 5, various embodiments of solar energy collectors, such as the solar energy collector 146, can be used in embodiments of solar energy collection systems, such as the sun tracking solar energy collection system 100 of FIG. 14 and a sun tracking solar energy collection system 500, of FIG. 5, including a solar energy collector 546, and should not be construed in a limiting sense.

Referring to FIGS. 1-5, the solar energy collector 146, 546 can include a collector base support member 148, 548, respectively. The collector base support member 148, 548 can have a collector rotatable member 149, 549, respectively. The collector rotatable member 149, 549 can be rotatably driven for rotatable movement 156, 556, respectively, in a horizontal plane PL1, PL2, respectively, relative to the collector base support member 148, 548, such as by a motor similar to the base motor 108.

The solar energy collector 146, 546 can further include a solar energy receiver support member 150, 550, respectively, in communication with the collector base support member 148, 548, respectively. The solar energy receiver support member 150 can include a pivotable member 151, and the pivotable member 151 of the solar energy receiver support member 150 and the solar energy receiver support member 550 are pivotably driven for pivotable movement 158, 558, respectively, relative to the corresponding horizontal plane PL1, PL2, of the corresponding collector base support member 150, 550, such as by a motor similar to the arm motor 118.

The solar energy receiver 152 and a solar energy receiver 552 are positioned in conjunction with the solar energy receiver support member 150, 550, respectively. The solar energy receiver 152, 552 is adapted to be movably positioned corresponding to the rotatable movement of the collector rotatable member 149, 549, respectively, and the pivotable movement 158 of the pivotable member 151 of the solar energy receiver support member 150 and the pivotal movement 558 of the solar energy receiver support member 550 to correspond to the position of the light source 126 and a light source 526, respectively, for receiving solar energy from the light source 126, 526. The light source 526 can be the sun, similar to the light source 126.

Figure 3A:
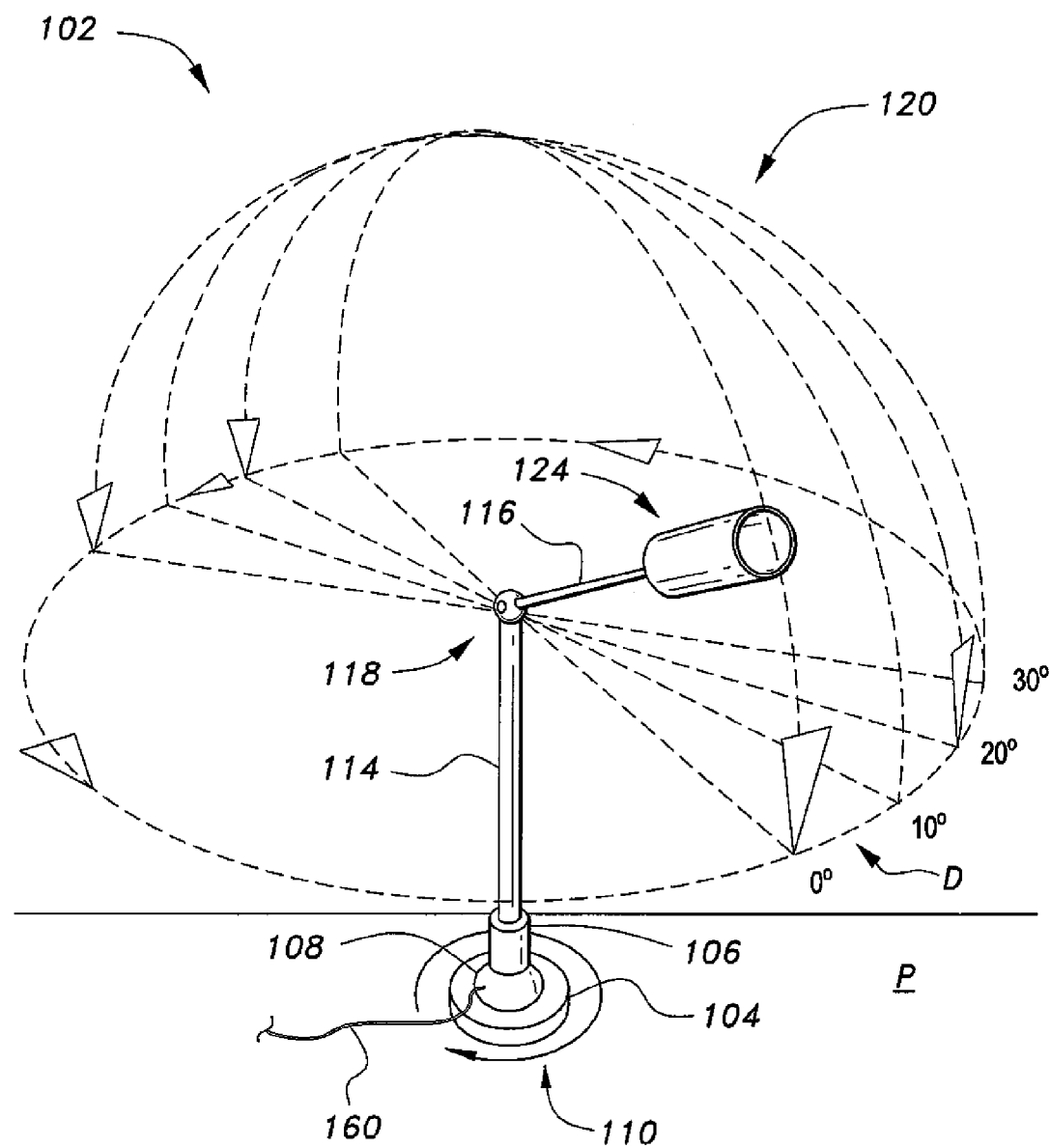
FIG. 3A is a perspective view of an embodiment of a sun tracker of FIG. 1 illustrating rotatable and pivotable movement of the sun tracker according to the present invention.
Figure 3B:
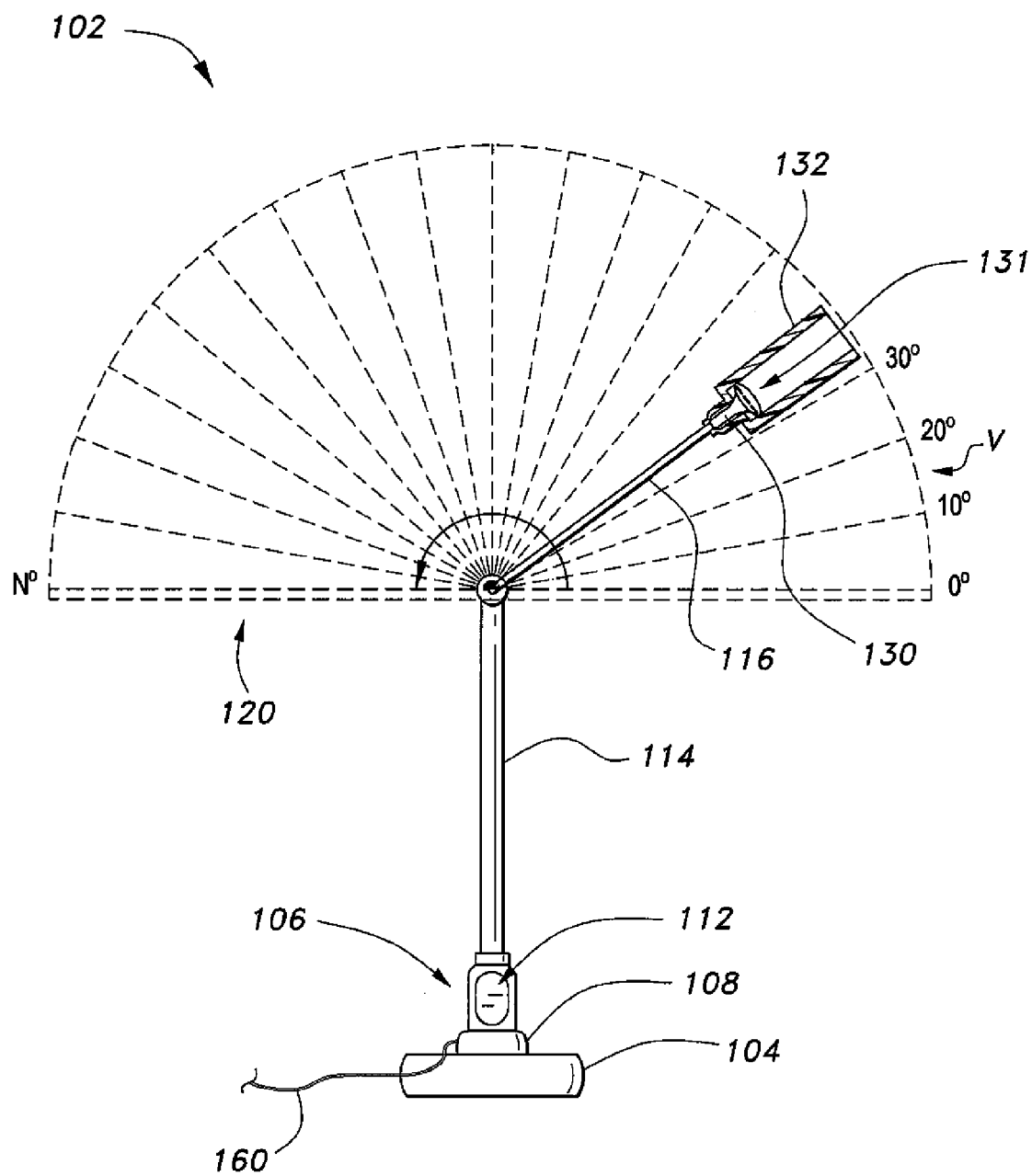
FIG. 3B is a sectional view of an embodiment of a sun tracker of FIG. 1 illustrating pivotal movement of the sun tracker according to the present invention.
Figure 3C:
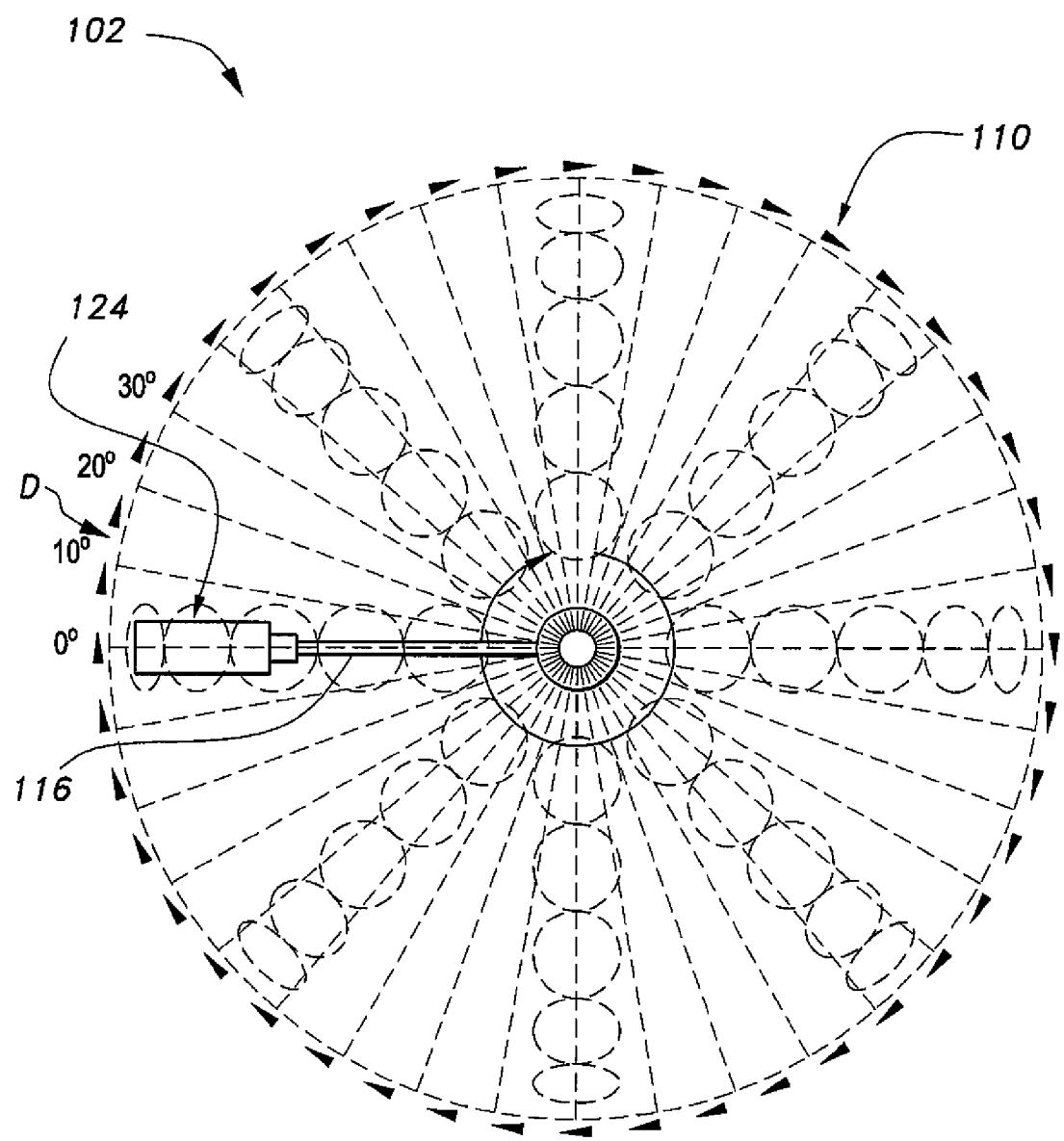
FIG. 3C is a top view of an embodiment of a sun tracker of FIG. 1 illustrating rotatable movement of the sun tracker according to the present invention.

In the sun tracking solar energy collection system 100, 500 the solar energy receiver 152, 552, respectively, is adapted to be movably positioned corresponding to the corresponding amount of the received measurements of the horizontal angular displacement and the vertical angular displacement, such as corresponding amount of the received measurements of the horizontal angular displacement D and the vertical angular displacement V, shown in FIGS. 3A and 3B, for example, to correspond to the position of the light source 126, 526, respectively, for receiving solar energy from the corresponding light source 126, 526. The solar energy receiver 152, 552 can have a variety of suitable reflecting elements, such as one or more mirrors or mirrored surfaces, for example. In this regard, the solar energy receiver 152, 552 can include one or more reflecting elements 154, 554, respectively, to direct the solar energy from the light source 126, 526, respectively. The one or more reflecting elements 154, 554, can include a hemispherical concave mirror, as shown in FIG. 1 for the solar energy receiver 152, and can include at least one hemi-cylindrical mirror, such as shown in FIG. 5 for the solar energy receiver 552.

Also, various embodiments and configurations of a sun tracker can be implemented with various embodiments of sun tracking solar energy collection systems, such as sun tracking solar energy collection system 100 and 500, and should not be construed in a limiting sense. For example, continuing with FIG. 5, an embodiment of a sun tracker 502 is shown. The sun tracker 502, similar to the sun tracker 102, includes a base support member 504. The base support member 504 is in communication with a rotatable member 514. The rotatable member 514 is rotatably driven for rotatable movement in a horizontal plane PL3 relative to the base support member 504.

The sun tracker 502 also includes a light sensitive element support member 516 in communication with the rotatable member 514. The light sensitive element support member 516 is pivotably driven for pivotable movement relative to the horizontal plane PL3 of the base support member 504. A light sensitive element 524, similar to the light sensitive element 124, is positioned in conjunction with the light sensitive element support member 516. The light sensitive element 524 is adapted to be movably positioned corresponding to the rotatable movement of the rotatable member 514 and the pivotable movement of the light sensitive element support member 516 to correspond to a position of the light source 526. The light sensitive element 524 is adapted for receiving the light 528 from the light source 526 to determine an amount of received light 528 from the light source 526.

A controller 536, similar to the controller 136, including a processor, similar to the processor 142 of the controller 136, to control a position of the sun tracker 502 to correspond to a position of the light source 526. The controller 536 selectively controls the rotatable movement of the rotatable member 514 and selectively controls the pivotable movement of the light sensitive element support member 516, based on the amount of light 528 received by the light sensitive element 524 from the light source 526 to selectively change a relative position of the rotatable member 514 and the light sensitive element support member 516 to correspond to the position of the light source 526. The controller 136, 536, can communicate with the sun tracker 102, 502 and with the solar energy collector 146, 546, through a communication line 160, 560, respectively. Also, the controller 136, 536, can wirelessly communicate with the sun tracker 102, 502 and with the solar energy collector 146, 546, such as through a suitable transceiver/receiver arrangement, for example.

It is to be understood that the present invention is not limited to the embodiments described above, but encompasses any and all embodiments within the scope of the following claims.

I claim:

1. A sun tracker, consisting of:
 a base, the base having a rotatable member associated with a base motor, the rotatable member being rotatably driven by the base motor, wherein the base of the sun tracker is positioned remotely from a solar collector;
 a first angular displacement sensor directly associated with the base and base motor to measure a relative horizontal angular displacement of the rotatable member along a horizontal plane relative to the base;
 a support, the support having a proximal end and a distal end, the support extending from the base and the first angular displacement sensor at the proximal end and associated with the rotatable member, the support being correspondingly directly rotatably driven in conjunction with the rotatable member by the base motor;
 an arm, the arm having a proximal end and a distal end, the proximal end of the arm in communication with the distal end of the support, the arm being pivotable relative to the base and support, the arm being pivotably driven by an arm motor associated with the arm at the proximal end;
 a second angular displacement sensor associated with the arm motor to measure a relative vertical angular displacement of the arm relative to the horizontal plane, the second angular displacement sensor being located at the proximal end of the arm;
 a single light sensitive element positioned directly at the distal end of the arm, the light sensitive element defining the sole light sensitive element adapted for receiving a light from a light source to determine an amount of received light from the light source, wherein the light sensitive element comprises a photoresistor, the photoresistor having a face adapted for receiving the light from the light source; and
 a controller including a processor, the controller to control a position of the sun tracker to correspond to a position of the light source, the controller to selectively control operation of the base motor to control rotatable movement of the rotatable member and to selectively control operation of the arm motor to control pivotable movement of the arm, based on the amount of light received by the light sensitive element from the light source, to selectively change a relative position of the rotatable member and the arm to correspond to the position of the light source.

2. The sun tracker according to claim 1, wherein
 the at least one first angular displacement sensor provides a measurement of an amount of the relative horizontal angular displacement to the controller,
 the at least one second angular displacement sensor provides a measurement of an amount of the relative vertical angular displacement to the controller, and
 the corresponding amount of the received measurements of the horizontal angular displacement and the vertical angular displacement correspond to a change in the relative position of the rotatable member and the arm corresponding to the change in position of the light source.

3. The sun tracker according to claim 2, wherein the controller is adapted for communication with a solar energy collector having a solar energy receiver to position the solar energy receiver to correspond to the position of the light source to receive solar energy based upon the corresponding amount of the received measurements of the horizontal angular displacement and the vertical angular displacement.

4. The sun tracker according to claim 1, wherein the photoresistor is positioned within a housing located in conjunction with the arm.

5. The sun tracker according to claim 4, wherein the light sensitive element is associated with a cover to selectively filter the light received from the light source to direct the light received onto the face of the photoresistor.

6. The sun tracker according to claim 1, wherein the light sensitive element is associated with a cover to selectively filter the light received from the light source to direct the light received onto the face of the photoresistor.

7. The sun tracker according to claim 1, wherein the controller includes an interface to communicate with the base motor, the arm motor, and the light sensitive element, the controller being associated with a memory programmed to store instructions to selectively control the relative movement of the rotatable member and the arm corresponding to the change in position of the light source.

8. The sun tracker according to claim 7, wherein the memory is selected from the group consisting of a Secure Digital (SD) card or a MultiMediaCard (MMC) card.

9. A sun tracker, comprising:
 a base, the base having a rotatable member associated with a base motor, the rotatable member being rotatably driven by the base motor, wherein the base of the sun tracker is positioned remotely from a solar collector;
 a first angular displacement sensor directly associated with the base and base motor to measure a relative horizontal angular displacement of the rotatable member along a horizontal plane relative to the base;

a support, the support having a proximal end and a distal end, the support extending from the base and the first angular displacement sensor at the proximal end and associated with the rotatable member, the support being correspondingly directly rotatably driven in conjunction with the rotatable member by the base motor, wherein the rotatable member and the base constitute the sole support for the proximal end of the support;

an arm, the arm having a proximal end and a distal end, the proximal end of the arm in communication with the distal end of the support, the arm being pivotable relative to the base and support, the arm being pivotably driven by an arm motor associated with the arm at the proximal end;

a second angular displacement sensor associated with the arm motor to measure a relative vertical angular displacement of the arm relative to the horizontal plane, the second angular displacement sensor being located at the proximal end of the arm;

a single light sensitive element positioned directly at the distal end of the arm, the single light sensitive element defining the sole light sensitive element adapted for receiving a light from a light source to determine an amount of received light from the light source, wherein the light sensitive element comprises a photoresistor, the photoresistor having a face adapted for receiving the light from the light source; and a controller including a processor, the controller to control a position of the sun tracker to correspond to a position of the light source, the controller to selectively control operation of the base motor to control rotatable movement of the rotatable member and to selectively control operation of the arm motor to control pivotable movement of the arm, based on the amount of light received by the light sensitive element from the light source, to selectively change a relative position of the rotatable member and the arm to correspond to the position of the light source.

* * * * *